Figure 2:
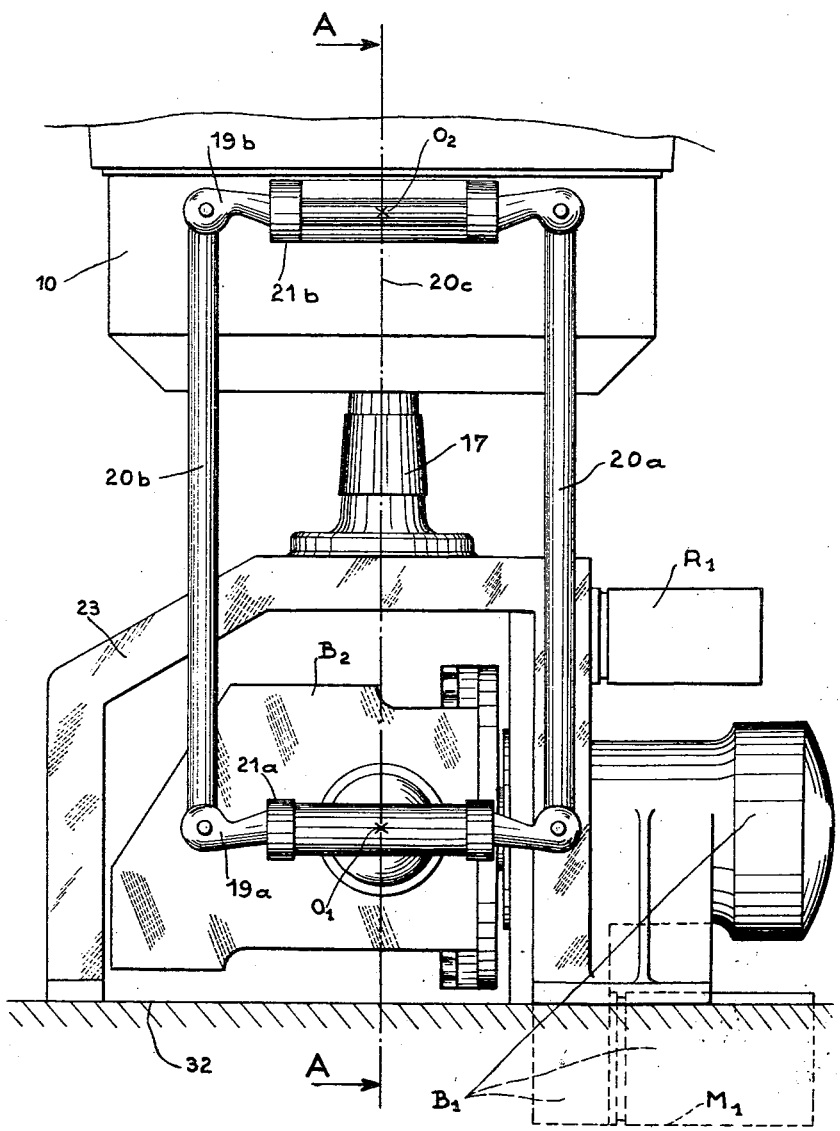

Dec. 18, 1962
H. LE TILLY ETAL
3,068,705
GYROSCOPIC APPARATUS
Filed Nov. 8, 1960
4 Sheets-Sheet 1
Fig. 1
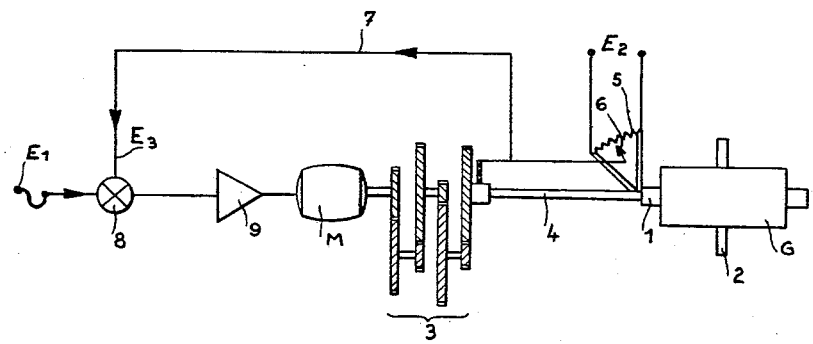
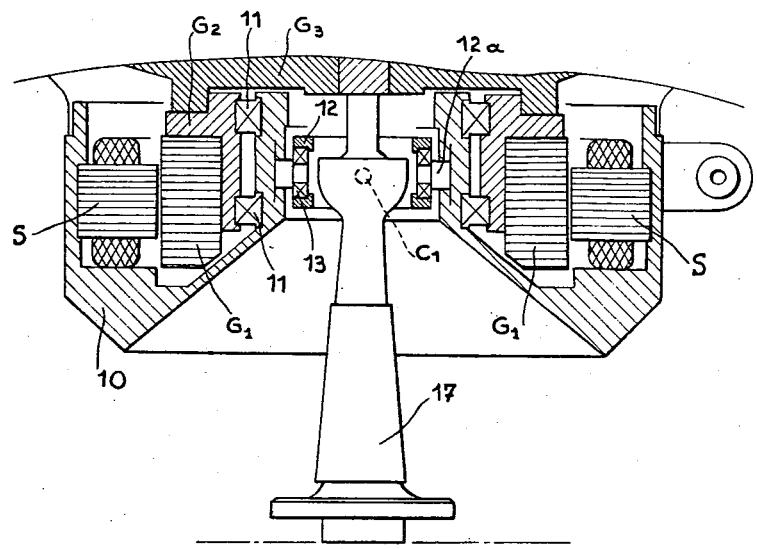
Fig. 4

Dec. 18, 1962  H. LE TILLY ETAL  3,068,705
GYROSCOPIC APPARATUS
Filed Nov. 8, 1960  4 Sheets-Sheet 3

United States Patent Office 3,068,705
Patented Dec. 18, 1962

3,068,705
GYROSCOPIC APPARATUS
Henri Le Tilly, Paris, and Louis Michel, Boulogne, France, assignors to Generale Aeronautique Marcel Dassault, Saint-Cloud (Seine-et-Oise), France, a company of France
Filed Nov. 8, 1960, Ser. No. 67,996
Claims priority, application France Nov. 12, 1959
19 Claims. (Cl. 74—5.4)

This invention relates to gyroscopic apparatus of the type in which mechanical torque is applied to and/or derived from at least one of the gyro suspension axes.

When mechanical torque is applied to one of the suspension axes of a gyroscope, precession occurs about the other suspension axis, and in theory the rate of precession is proportional to the applied torque. This effect is commonly used in erection systems for maintaining the gyro spin axis in a prescribed orientation.

Similarly but conversely, when a gyroscope is precessing about one of its suspension axes, a mechanical torque can be derived from the other suspension axis, and the torque thus produced is, again in theory, proportional to the rate of precession. This converse effect is also commonly utilized for measuring and/or control purposes, in gyro erection systems and elsewhere.

However, the theoretical proportionality between precession rate and torque about the conjugate suspension axes is, in practice, generally marred by the presence of unavoidable disturbances. The disturbances may take the form of non-linearity effects in the torque-applying mechanism, various parasitic torques of external origin creating parasitic precession of the gyroscope, and so on. Some examples of such disturbances may be given as follows:

Considering the various types of "torquer" mechanisms available for applying mechanical torque to a gyro suspension axis, the so-called torque motor which basically embodies an angularly displaceable electromagnet, is unsatisfactory for large values of angular displacement because the applied torque is then variable with displacement. In this respect high-torque, low-velocity motors would be more satisfactory, but these are heavy, space-consuming, are not available as standard equipment and are unsuitable for use especially for airborne applications. Conventional electric motor-and-reducer units would be generally satisfactory, except for the fact that the high-ratio reduction gearing required introduces a substantial loading which generates a disturbing torque, including non-linear effects due to inertia, backlash, elasticity, thermal effects and the like. Also, in many cases it would be desirable to interpose a clutch, e.g. an electromagnetic clutch, in the drive from an electric torquer to the gyro trunnion. Such clutches also show considerable unstability and non-linear characteristics.

Another type of disturbance may be due to the fact that the gyroscope is mounted on a movable support or platform, since the platform movements create parasitic precession.

For the above and similar reasons, the mechanical torque applied to, or derived from, a gyro trunnion usually will not present a strictly linear relationship with the gyro precession rate caused by, or causing, said torque, and this condition seriously impairs the accuracy and effectiveness of operation of various types of gyroscopic apparatus.

It is a major object of this invention to provide gyroscopic apparatus in which the linear relationship between torque and precession rate is greatly improved, thereby enhancing the operating characteristics of gyroscopic devices of many different classes.

In accordance with a broad aspect of the invention, there is provided gyroscopic apparatus comprising a gyroscope, a motor connected through a transmission with a suspension axis of the gyroscope for applying a torque thereto, elastically deformable means interposed in said transmission, means developing a torque signal corresponding to the elastic deformation of said deformable means, and a connection for applying said torque signal to the motor.

In a preferred aspect, said apparatus comprises a gyroscope, an electric motor connected through a transmission with a suspension axis of the gyroscope for applying a torque thereto in accordance with a control signal applied to the motor, elastically deformable means interposed in said transmission, means developing an electric torque signal corresponding to the elastic deformation of the deformable means, and a feedback connection for combining the torque signal in degenerative relation with the control signal.

It will be appreciated that in apparatus according to the invention, any non-linear disturbing effects such as may be due to gearing or the like interposed in the transmission, or other causes, are effectively cancelled out by the torque feedback provided, and a high degree of linearity and stability is obtained in the overall gyro control channel. It will also be understood that the motor can serve both for the purpose of applying mechanical torque to the suspension axis to cause a desired precession (at strictly predetermined rate) about the other suspension axis, also for balancing a torque developed on said first mentioned suspension axis as a result of precession about said other axis; in either case there will be strict proportionality between the torque and precession rate involved.

Conveniently the deformable means are in the nature of a torsion bar. Further, a phase advancing device may desirably be interposed in the direct signal connection.

Figure 3:
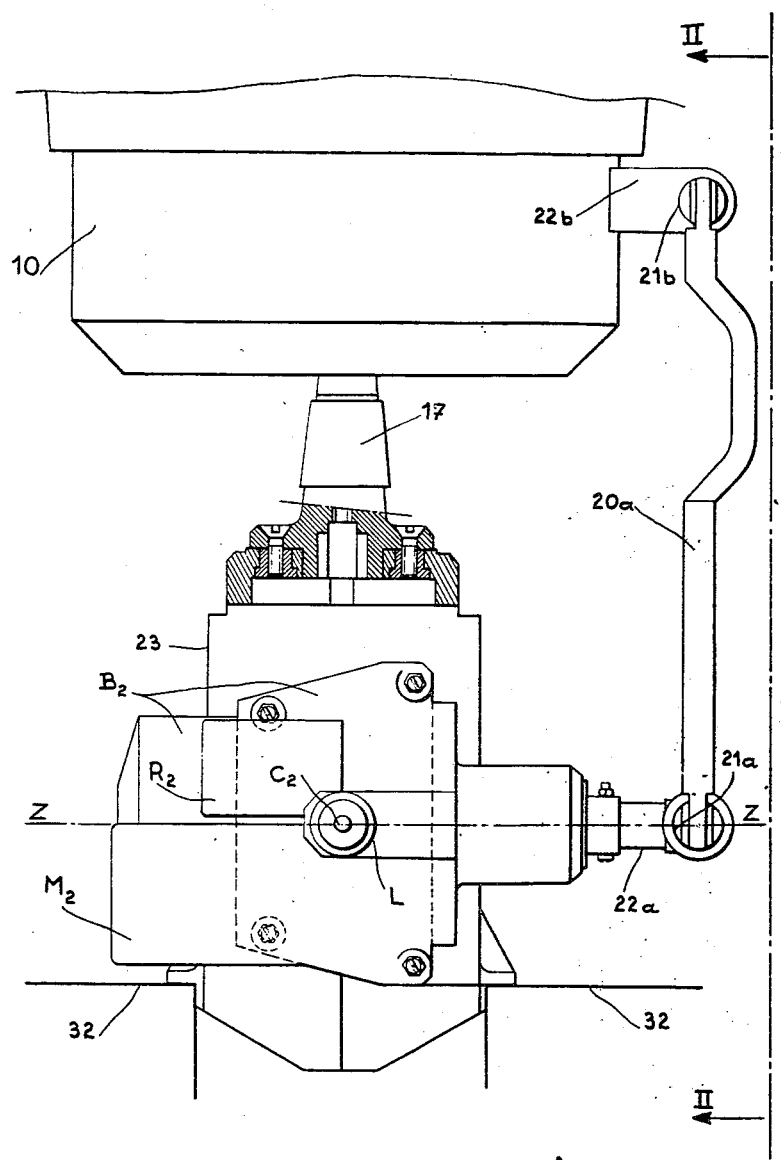
Figure 5:
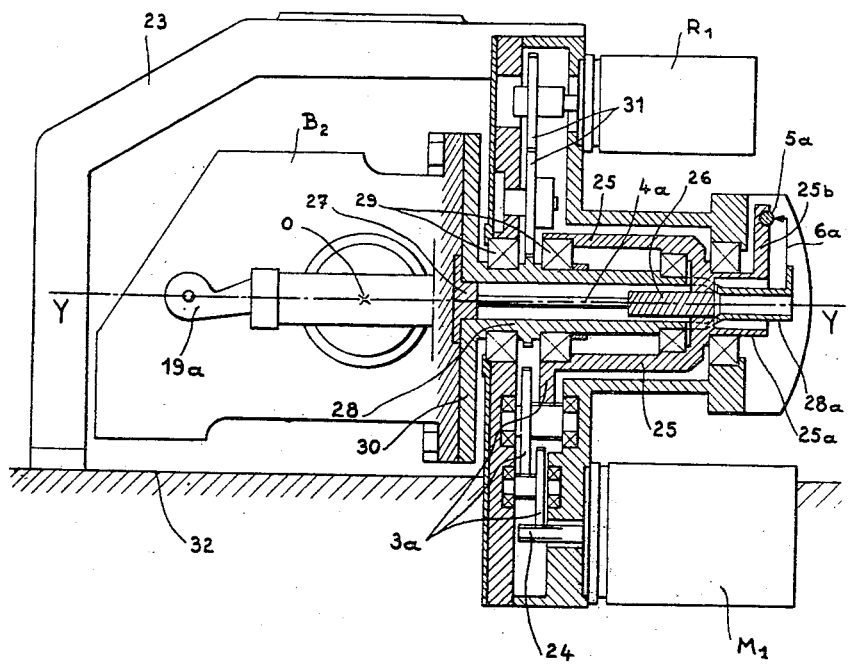

While the invention is applicable to a wide variety of gyroscopic apparatus, e.g. for directional and orientation indication and control, stabilization and the like, it will be described hereinafter with reference to a particular embodiment, namely the stabilization of an airborne radar antenna in angular position. In the accompanying drawings:

FIG. 1 is a simplified diagram illustrating the principle of the invention;

FIGS. 2 to 5 show various views of the afore-mentioned embodiment of the invention; FIG. 2 being an outer elevational view; FIG. 3 an elevational view on a plane at right angles to FIG. 2, partly in section on line A—A thereof; FIG. 4 is a fragmentary view, partly in section on line A—A of FIG. 2 and partly in elevation, illustrating features of gyro construction; and FIG. 5 is a fragmentary view partly in section on the same plane as FIG. 2 and partly in elevation, illustrating features of construction of one of the suspension axes control systems according to the invention.

Referring to FIG. 1, a gyroscope G is there schematically illustrated in conventional outline as comprising the mutually normal suspension axes or trunnions in 1 and 2. An electric motor M serves to apply a mechanical torque to the trunnion 1 by way of a transmission including the high-ratio reducer gearing 3. As will be apparent to those familiar with the art, the torque applied by motor M may serve to create precession of the gyro about trunnion 2, or may serve to balance a torque generated about trunnion 1 due to precession about trunnion 2 as for measuring the rate of said precession.

The motor is shown energized with a control signal voltage E1 applied thereto by way of an amplifier 9. The voltage signal E1 may be derived from the output of any suitable source, such as a synchro, and may e.g. be a measure of the angular displacement of the radar antenna being stabilized from a target direction, as later explained.

In accordance with the invention there is interposed in the motor transmission path between the output of gear reducer 3 and the gyro trunnion 1 an elastically deformable element here shown in the form of a torsion rod or bar 4 having a suitable rate of angular deformation proportional to the torque transmitted through the rod. As shown, the torsion rod 4 has an output gear of reducer unit 3 fixed to one end of it while its other end is secured to the gyro trunnion 1. This arrangement however is chiefly schematic. Means are provided for generating an electric signal proportional to the torsional deformation of the rod 4. Said means are diagrammatically shown as comprising a potentiometer having a slidewire resistance 5 supported from the end of rod 4 secured to trunnion 1 and having a slider contact 6 supported from the other end of rod 4. The slidewire resistance 5 is connected across a voltage source E2. The slider contact 6 thus carries a voltage E3 proportional to the torsional deformation of connecting rod 4 and this voltage is applied via a feedback connection 7 to the input of amplifier 9 in degenerative relation to the control voltage E1. Diagrammatically the feedback connection 7 is shown applied to one input of a suitable comparator device 8 interposed in the line through which the control signal is applied to the amplifier.

With this arrangement, it will be apparent that the effective or net energizing voltage applied to motor M is the amplified difference or error signal between control signal E1 and the torque signal E3.

One practical embodiment of the invention will now be described with reference to FIGS. 2 to 5. This embodiment comprises a vertical gyroscope serving to stabilize an airborne radar antenna, together with a torque system of the kind schematically shown in FIG. 1, applied to each of the two suspension axes of the gyroscope.

The gyroscope itself, in the exemplary embodiment, is of the type in which the spinning rotor is suspended for universal motion about gimbals positioned within the rotor so as to be closely adjacent to the center of rotation of the gyro assembly. It is to be understood that the invention is applicable also to the more conventional construction involving gimbal frames exterior to the rotor.

As shown in FIGS. 2 and 3 the gyroscope itself is enclosed in a casing 10 which is universally supported for limited angular displacement in all planes, upon an upright support 17 upstanding from a platform 23 secured to the airborne frame. Referring to FIG. 4, the gyro comprises an annular rotor G1 constructed as an electric motor armature for high-speed rotation by the action of a surrounding wound stator mounted in the casing 10. The rotor armature G1 is fixed to an annular rotor member G2 which is rotatably supported with respect to the casing 10 through bearings 11 for rotation about a normally vertical spin axis. The casing 10 which can thus be said to constitute one of the gimbal frames or rings of the gyro assembly is rotatably supported through bearings 13 from an inner gimbal ring 12 for rotation with respect thereto about a first normally horizontal axis 12a. Inner gimbal ring 12 is in turn supported for rotation, through bearing means not shown, by the central fixed upright 17, about a second normally-horizontal axis which is normal to the plane of the paper in FIG. 4 through the center point C1.

In the illustrated embodiment the gyroscope serves to stabilize the orientation of a radar antenna which is driven in high speed rotation with the gyro rotor. For this purpose, the antenna body partly shown in FIG. 4 as G3 is solidly secured to the rotor member G2 and is rotatable therewith.

Thus it will be seen that the gyro casing 10 is bodily orientable with three degrees of freedom or universally, about the upright 17. For applying torque to the gyro casing 10 around two mutually normal axes of the universal suspension the following means are provided.

As shown in FIGS. 2 and 3, a pair of spaced brackets 21b project from a side of casing 10 and a rod 19b is pivoted in said brackets. Rod 19b constitutes the upper link of a deformable parallel linkage including the lower link 19a and the side links 20a and 20b, which are pivoted at their ends to the opposite ends of upper and lower links 19b and 19a, about axes normal to the plane of the parallelogram linkage. Lower link 19a is pivoted in spaced brackets 21a projecting from a frame B2 presently described. Thus it will be seen that the parallel linkage members as described are actually displaceable in two mutually orthogonal planes, and this provides a means of applying torque to the gyro housing 10 about two mutually normal axes, depending upon how the linkage members are displaced in the plane of FIG. 2 (about the inter-link pivots) and/or are displaced in the plane of FIG. 3 (about the longitudinal axes of upper and lower links 19a, 19b within the brackets 21a, 21b).

Referring to FIGS. 2 and 5, frame or housing B2 is bodily rotatable about an axis Y—Y by an electric motor M1 through means to be presently described, and on rotation of frame B2 the parallel linkage members are displaced about the axes of links 19a, 19b as just stated so as to rotate the gyro housing 10 in the plane of FIG. 3. The means for rotating frame B2 from motor M1 comprise a first control unit constructed in accordance with the invention and generally designated B1.

As shown in FIG. 5, the output shaft 24 of motor M1 is formed with an integral pinion forming the input to a reducer gearing generally designated 3a the output of which rotates a sleeve 25 journalled in an end bearing in the apparatus frame 23. Sleeve 25 has an integral hub member 26 which is rigidly coupled with the right-hand end of a torsion rod 4a extending axially of the sleeve 25. The left hand end of torsion rod 4a is rigidly coupled by way of a hub member 27 with the rotatable frame B2. Thus it is seen that motor M1 rotates frame B2, and by way of said frame and the parallel linkage the gyro casing 10, through a transmission which includes the reducer gearing 3a followed by torsion rod 4a, in accordance with the principle earlier described (FIG. 1).

A potentiometer device is shown in FIG. 5 as comprising the slidewire resistance 5a and slider arm 6a. Slidewire 5a is mounted on a support 25b which is integrally secured to an axial extension flange 25a projecting from sleeve 25 and hence rigidly coupled with the right end of torsion rod 4a. Slider 6a in turn is mounted on an axial extension flange 28a which projects from the right end of an inner sleeve 28 extending coaxially within outer sleeve 25 and rotatably supported therein and in frame 23 by way of bearings 29. The left end of inner sleeve 28 is integrally formed with a radial flange 30 which is secured, e.g. bolted, to the rotatable frame B2 and is hence rigidly coupled with the left end of torsion rod 4a. Thus it is seen that the potentiometer resistance and slider are respectively coupled with the opposite ends of the torsion bar as explained with reference to FIG. 1. An electrical connection, not shown, is provided from the slider 6a to an amplifier feeding motor M1, as also explained earlier.

The rotatable frame B2 houses a second control unit which is generally similar to the stationary control unit B1 just described, and likewise including a motor which, through a reducer gearing and torsion bar, acts to impart bodily rotation to both brackets 21a and link 19a journalled therein, about a geometric axis indicated at O₁ in FIG. 2. Since the second control unit housing in B2 is bodily rotatable, it will be evident that it is capable of displacing the parallel linkage member and hence rotating gyro housing 10 in the plane of FIG. 2, regardless of the angular position of the gyro casing in the plane of FIG. 3 as produced by the first control unit.

As shown in FIG. 5 in connection with the first control unit B1, each control unit may further include a signal generator R1, R2, respectively, such as a synchro resolver for example, the rotor of which is driven from motor M1, M2, respectively, through reducer 3a followed by further gearing 31, and which resolver can serve for remote indication of the angular position and/or precession rate of the gyro about the related axis.

Advantageously, a phase-advancing network is inserted in the direct signal path ahead of each motor, and such network is preferably inserted between the subtracting device 8 and amplifier 9 in FIG. 1.

While the electrical components of the circuit may assume any of various forms, in the embodiment described the control voltage signal E1 is direct current, as is also the torque feedback signal derived from generator 5—6. However, the motor M is a two-phase alternating current motor. The subtractor or comparator device 8 is in this case a resistance bridge, and the D.C. error voltage derived therefrom after passing through the afore-mentioned phase-advancing network is modulated with an A.C. reference voltage in a conventional phase discriminator which may comprise a first stage of amplifier 9, so as to provide an A.C. signal of one or opposite phase depending on the polarity of the error signal. The amplified, phase-discriminated A.C. error signal is applied to the control phase of motor M in the usual way.

In a practical embodiment of the invention, the components had the following numerical characteristics:

The gyroscope had a kinetic moment of $3.10^7$ c.g.s. units and a spin velocity of 11,500 r.p.m. The total weight of the gyro assembly was 3,200 grams.

The electric motors used were two-phase motors energized with 26 volt 400 cycle current in the control phase. The maximum motor output torque was 40 g./cm., and maximum speed was 11,000 r.p.m.

The over-all time constant of the servo-loop including the torsion bar response was $\frac{1}{18}$ second.

The reducer gearing had a reducer ratio of 1:150.

The torsion rod had a torsion spring rate of 2,500 g./cm. torque per 10° angular deformation. The range of angular deformation was 12° to either side of its neutral relaxed condition. For this purpose a rod of spring steel having an elastic yield point of 150 kg./mm.$^2$ was used, the length of the rod was 30 mm. and its diameter 1.5 mm.

The operation of the improved gyroscopic apparatus described will now be summarized. The operation will successively be considered in the case where the motor M is used to apply voluntarily a predetermined torque to the gyro axis 1 (FIG. 1) to cause gyro precession at a prescribed rate about axis 2 (controlled gyro operation) and in the case where the motor serves to balance the torque created about axis 1 due to a precession of the gyro about axis 2 (free gyro operation).

In controlled gyro operation, the torque signal E3 delivered by potentiometer 5—6 is compared with the control voltage signal E1 in comparator or subtractor device 8. The error signal from device 8 is amplified (preferably after phase advance), and applied to motor M. The error signal represents the error between the desired torque to be applied in order to produce a prescribed precession rate of the gyro, and the torque actually applied. Motor M is suitably connected to be rotated in the sense tending to reduce the error voltage to zero. Thus in the equilibrium condition the torque applied to the gyro axis has the precise value required for causing the gyro to precess at exactly the prescribed precession rate.

In case of free gyro operation, assuming the platform on which the gyro is mounted undergoes a rotational displacement about any control axis, then since the spin axis of the gyro rotor remains fixed in space the torsion rod 4 (FIG. 1) is deformed, and a certain torque signal is generated and an error signal is delivered from comparator 8, amplied and applied to motor M. The motor then rotates in the sense to reduce the error to zero so that in the resulting equilibrium condition the torque applied to torsion rod 4 is zero.

As already stated the gyroscopic apparatus of the invention is especially useful, among other applications, to the stabilization of an airborne platform, e.g. a gyroscopic radar antenna as used on board aircraft, ballistic missiles and the like. As will be understood from the foregoing description of operation, the apparatus makes it possible to direct the spin axis of the gyro rotor, which axis coincides with the electromagnetic axis of the radar antenna, towards a preselected target, with a high degree of accuracy and stability. In such case the control voltage may be proportional to the angular displacement detected by the radar system as between the actual direction of the antenna axis and the desired target direction. Moreover, the torque applied to the gyro is proportional to the precession rate. Thus the precession rate is accurately measured at all times with the apparatus of the invention and can serve as a control factor in the guidance of the aircraft or missile towards the target, through conventional automatic guidance means well-known in the art.

The servo-system constituting the apparatus of the invention is preferably so constructed and adjusted as to pass a frequency band at least including the frequency of small parasitic disturbance movements of the aircraft or missile, i.e. platform movements, which movements may have a maximum frequency e.g. on the order of 15 cycles per second. The gyroscopic apparatus of the invention will then effectively behave as a free gyroscope. In this connection, it is here recalled that any servomechanism is normally predetermined to operate without substantial error or hunting within a certain frequency band from zero to a maximum frequency $f$, i.e. the pass band of the servo-system considered as a lowpass filter. In operation such a system may have to respond to two types of signals, command signals, which have one maximum frequency value $f1$, applied to the input of the servomechanism, and disturbance signals of another maximum frequency $f2$. The afore-mentioned cutoff frequency $f$ of the apparatus is predetermined so as to be higher than the higher one of the frequencies $f1$ and $f2$. In the exemplary embodiment of the invention described, the control signal frequency $f1$ may be on the order of 1 c.p.s. while the disturbance signal frequency $f2$ will usually be of approximately 15 c.p.s. The parameters of the system components are predetermined and adjusted, as previously indicated, to provide a cutoff or maximum frequency higher than this latter value, say about 18 c.p.s. In such conditions the gyroscopic apparatus will behave substantially as a free gyroscope in respect to any small disturbance movements.

It will be understood that various modifications may be made in the structures illustrated and described without exceeding the scope of the invention. Thus, for example, instead of the dual parallel linkage means shown for transmitting the torque from the motor to the gyro about the two mutually normal axes, various other means may be used, including a direct torsional action on each of the two mutually normal gyro trunnions (as diagrammatically shown in FIG. 1). Further, rather than the motor and reducer gearing means illustrated, there may be used conventional electromagnetic torque motors. The actual construction of the gyroscope can itself differ considerably from that shown. The invention is applicable to gyroscopes in which the spin axis is horizontal—e.g. directional gyros—rather than vertical as shown. The deformable element may be deformable in flexion rather than torsion. Various other modifications will occur to those familiar with the art.

What we claim is:

1. Gyroscopic apparatus comprising, in combination, a tiltable housing, a gyroscope mounted in said housing and having thereby three degrees of freedom about mutually normal suspension axes, a motor, a transmission connecting the motor with said housing for applying a torque thereto and thus to said gyroscope therein about at least one suspension axis, a torsion bar interposed in said transmission, means developing a torque signal corresponding substantially solely to the elastic deformation of said torsion bar, and a connection for applying the torque signal to the motor.

2. Gyroscopic apparatus, in combination, a tiltable housing, comprising a gyroscope mounted in said housing and having thereby three degrees of freedom about mutually normal suspension axes, an electric motor, means applying to said motor an electrical input signal, a transmission connecting the motor with said housing for applying a torque thereto and thus to said gyroscope therein about at least one suspension axis in accordance with said input signal applied to the motor, elastically deformable means interposed in the transmission, means connected to the respective ends of the deformable means and developing an electric torque signal corresponding substantially solely to the elastic deformation of the deformable means, and a feedback connection including differential means connected ahead of said motor for combining the torque signal in degenerative relation with the input signal prior to application thereof to said motor.

3. Gyroscopic apparatus comprising, in combination, a tiltable housing, a gyroscope rotatably supported in said housing, a low-torque electric motor connected through a transmission with said housing for applying a torque thereto and thus to said gyroscope therein about at least a suspension axis thereof in accordance with an input signal applied to the motor, said transmission including a high-ratio reducer gearing, an elastically deformable element interposed in said transmission between the output of said gearing and said housing, means connected to the respective ends of the deformable means and developing an electric feedback signal corresponding substantially solely to the elastic deformation of said element, and a feedback connection including differential means connected ahead of said motor for combining the feedback signal in degenerative relation with the input signal prior to application thereof to said motor.

4. Gyroscopic apparatus comprising, in combination, a tiltable housing, a gyroscope rotatably supported in said housing, an electric motor connected through a transmission with said housing for applying torque thereto and thus to said gyroscope therein about at least one suspension axis thereof, said transmission including a single torsional element interposed therein so as to be elastically deformable in torsion in proportion to the torque transmitted through said transmission, an electric signal generator having two relatively movable parts respectively mechanically connected with opposite ends of said element and developing an electric signal corresponding substantially solely to the torsional deformation of said single torsional element, and an electrical negative feedback connection for applying said signal to said motor.

5. Apparatus as claimed in claim 4, wherein said signal generator comprises a potentiometer.

6. Gyroscopic apparatus comprising in combination, a tiltable housing, a gyroscope mounted in said housing and having thereby three degrees of freedom about mutually normal suspension axes, first and second electric motors; transmissions respectively connecting said motors with said housing for applying torque thereto and thus to said gyroscope therein about two of said axes, an elastically deformable element interposed in each transmission, respective electric signal generating means developing electric signals corresponding to the elastic deformation of the respective elements, and feedback connections for applying the respective signals in degenerative relation to the related motors.

7. Gyroscopic apparatus as claimed in claim 6, wherein said transmissions include parallel linkage means displaceable in mutually normal planes, one end of said linkage means being connected with said gyroscope and means connecting the respective motors with the other end of the linkage for displacing the linkage means in each of said planes respectively.

8. Gyroscopic apparatus comprising, in combination, a tiltable housing, a gyroscope mounted in said housing and having thereby three degrees of freedom about mutually normal suspension axes, a motor connected through a transmission with said housing for applying a torque thereto about one suspension axis, elastically deformable means interposed in said transmission, means connected to opposite ends of the deformable means and developing a torque signal corresponding substantially solely to the elastic deformation of the deformable means, and a feedback connection for degeneratively applying the torque signal to the motor thereby to constitute a servo-loop, the characteristics of said servo-loop being so predetermined as to impart to the servo-loop a substantially high inherent cutoff frequency.

9. Gyroscopic apparatus as claimed in claim 8, wherein said cutoff frequency is higher than about 15 cycles per second.

10. Gyroscopic apparatus, comprising a gyroscope mounted for three degrees of freedom about mutually normal suspension axes; first and second electric motors for applying respective torques to the gyroscope about two of said axes, respectively; dual parallel linkage means for transmitting angular motion about mutually perpendicular axes; first universal joint means connecting one end of the dual linkage means with the gyroscope; a pair of transmissions connecting the respective motors with the other end of the dual linkage and including second universal joint means for transmitting to the gyroscope through said linkage means angular motion about either one of said axes, respectively; an elastically deformable element interposed in each of the transmissions; respective electric signal generators developing electric signals corresponding to the elastic deformation of the respective elements; and feed-back connections for applying the respective signals in degenerative relation to the related motors.

11. Gyroscopic apparatus as claimed in claim 10, wherein said elastically deformable elements comprise respective torsion rods.

12. Gyroscopic apparatus as claimed in claim 10, wherein each of said transmissions includes a reducer gearing between said motor and said elastically deformable element.

13. Gyroscopic apparatus comprising, a gyro casing; universal suspension means supporting said casing for angular displacement about mutually perpendicular axes; dual parallel linkage means for transmitting angular motion about mutually perpendicular axes; first universal joint means connecting one end of said linkage means to said casing, second universal joint means being located at the opposite end of said linkage means; a first torquer connected to said second universal joint means and operable to move said linkage means in one direction in which it displaces the gyro casing angularly about one of said axes; and a second torquer connected to said second universal joint means and operable to move said linkage means in a different direction in which it displaces the gyro casing angularly about the other of said axes.

14. Gyroscopic apparatus as claimed in claim 2, wherein said motor is an A.C. motor, said input signal is a D.C. voltage signal, said signal developing means comprises a D.C. voltage generator, said differential means comprises a D.C. comparison network, and further including modulator means having one input connected to receive the D.C. comparison signal from said differential means and having another input connected to receive an A.C. reference voltage, and said modulator means having a modulated A.C. output connected to said motor.

15. Gyroscopic apparatus as claimed in claim 2, further including a phase advance network connected between the output of said differential means and said motor.

16. Gyroscopic apparatus, comprising, in combination, a gyroscope; frame means supporting said gyroscope for rotation relative to said frame means about a main axis; universal suspension means supporting said frame means for angular displacement about two secondary axes perpendicular to each other and transverse to said main axis; an electric motor; transmission means arranged between said motor and said frame means for applying a torque thereto causing an angular displacement thereof about one of said secondary axes, said transmission means including an elastically deformable torque transmitting element; electric signal generator means co-operating with said torque transmitting element and developing a signal proportional to an elastic deformation of said torque transmitting element due to its transmitting a torque; and circuit means for applying said signal in degenerative relation to said motor.

17. Gyroscopic apparatus, comprising, in combination, a gyroscope; frame means supporting said gyroscope for rotation relative to said frame means about a main axis; universal suspension means supporting said frame means for angular displacement about two secondary axes perpendicular to each other and transverse to said main axis; a first and a second electric motor; first and second transmission means arranged between said first and second motor, respectively, and said frame means for applying a torque thereto causing an angular displacement thereof about a first and a second one of said secondary axes, respectively, said first and second transmission means including each an elastically deformable torque transmitting element; first and second electric signal generator means co-operating with said torque transmitting elements, respectively, and developing a signal proportional to an elastic deformation of the respective torque transmitting element due to its transmitting a torque; and circuit means for applying said signal in degenerative relation to said motor.

18. Gyroscopic apparatus, comprising, in combination, a gyroscope; frame means supporting said gyroscope for rotation relative to said frame means about a main axis; universal suspension means supporting said frame means for angular displacement about two secondary axes perpendicular to each other and transverse to said main axis; an electric motor; transmission means arranged between said motor and said frame means for applying a torque thereto causing an angular displacement thereof about one of said secondary axes, said transmission means including an elastically deformable torque transmitting element, said transmission means further including high-ratio reducing gear means between said motor and said torque transmitting element, and linkage means between said torque transmitting element and said frame means; electric signal generator means co-operating with said torque transmitting element and developing a signal proportional to an elastic deformation of said torque transmitting element due to its transmitting a torque; and circuit means for applying said signal in degenerative relation to said motor.

19. Gyroscopic apparatus, comprising, in combination, a gyroscope; frame means supporting said gyroscope for rotation relative to said frame means about a main axis; universal suspension means supporting said frame means for angular displacement about two secondary axes perpendicular to each other and transverse to said main axis; a first and a second electric motor; first and second transmission means arranged between said first and second motor, respectively, and said frame means for applying a torque thereto causing an angular displacement thereof about a first and a second one of said secondary axes, respectively, said first and second transmission means including each an elastically deformable torque transmitting element, each of said transmission means further including high-ratio reducing gear means between the respective motor and the respective torque transmitting element, universal joint linkage means being arranged between said torque transmitting elements and said frame means for causing an angular displacement thereof about either one of said secondary axes depending upon which one of said motors transmits a torque; first and second electric signal generator means co-operating with said torque transmitting elements, respectively, and developing a signal proportional to an elastic deformation of the respective torque transmitting element due to its transmitting a torque; and circuit means for applying said signal in degenerative relation to said motor.

References Cited in the file of this patent

UNITED STATES PATENTS

| 2,704,456 | Hammond | Mar. 22, 1955 |
| 2,937,532 | Emmerich | May 24, 1960 |
| 2,951,373 | Summers | Sept. 6, 1960 |